(12) United States Patent
Niekamp

(10) Patent No.: US 7,676,518 B2
(45) Date of Patent: Mar. 9, 2010

(54) CLUSTERING FOR STRUCTURED DATA

(75) Inventor: Tobias Niekamp, Kaiserslowtern (DE)

(73) Assignee: SAP AG, Walldorf (DE)

( * ) Notice: Subject to any disclaimer, the term of this patent is extended or adjusted under 35 U.S.C. 154(b) by 226 days.

(21) Appl. No.: 11/505,764

(22) Filed: Aug. 16, 2006

(65) Prior Publication Data
US 2008/0046430 A1    Feb. 21, 2008

(51) Int. Cl.
*G06F 17/30* (2006.01)
*G06F 17/00* (2006.01)

(52) U.S. Cl. .................. 707/737; 707/748; 707/749
(58) Field of Classification Search ............. None
See application file for complete search history.

(56) References Cited

U.S. PATENT DOCUMENTS

| | | | | |
|---|---|---|---|---|
| 5,317,741 | A * | 5/1994 | Schwanke | 717/120 |
| 6,581,058 | B1 * | 6/2003 | Fayyad et al. | 707/6 |
| 7,349,914 | B1 * | 3/2008 | Ordonez | 707/101 |
| 2005/0262192 | A1 * | 11/2005 | Mamou et al. | 709/203 |
| 2006/0106762 | A1 * | 5/2006 | Caracas et al. | 707/3 |

OTHER PUBLICATIONS

Breunig et al., Data Bubbles: Quality Preserving Performance Boosting for Hierarchical Clustering, May 2001, ACM. pp. 79-90.*
Lee et al., Distributional Similarity Models: Clustering vs. Nearest Neighbors, 1999, ACL, pp. 33-40.*
Gerardo et al., The K-Means Clustering Architecture in the Multistage Data Mining Process, May 2005, ICCSA 2005, vol. 3481, pp. 71-81.*

* cited by examiner

*Primary Examiner*—James Trujillo
*Assistant Examiner*—Dawaune Conyers
(74) *Attorney, Agent, or Firm*—Mintz, Levin, Cohn, Ferris, Glovsky & Popeo, P.C.

(57) ABSTRACT

A system and method for processing data using a bubble clustering algorithm are presented. In the system and method, a set of data is formatted for processing. A set of business objects containing the formatted data is grouped into a smaller set of bubbles, each bubble comprising a container that provides only statistical information about the business objects therein. The bubbles are then clustered based on a nearest neighbor similarity, and a visualization of the clustered bubbles is generated.

19 Claims, 5 Drawing Sheets

CLUSTERING FOR STRUCTURED DATA

BACKGROUND

This disclosure relates generally to computer-based mechanisms for processing data sets, and more particularly to techniques for precisely executing processes on large data sets.

Many information processing applications involve statistical ranking or classification of large numbers of objects. These objects are represented by large volumes of structured data organized in relational tables that include attributes with values, which are typically numerical. The attribute values describe the objects. The statistical ranking or classification of objects is performed on the basis of the values of these attributes.

Objects so understood are typical of business applications where objects such as products or sales orders have attributes such as price or date with numerical values, and the data describing these objects is typically stored in relational databases. Applications dealing with such objects may often need to cluster the objects for the purposes of classification or ranking. For large numbers of objects, it is of great practical importance to use efficient clustering algorithms in order to economize on the computational resources required to implement those algorithms.

SUMMARY

In general, this document discusses systems and methods for clustering structured data to deliver high-quality results for searches on large data sets. The methods disclosed in this document are business objects, but may easily be adapted to work with other objects that satisfy the general characterization presented above. For clarity but without loss of generality, this disclosure describes the methods and algorithms in terms of business objects.

In particular embodiments of the systems and methods, an algorithm is used which presupposes a similarity model that is defined over the business objects and is based on specific domain knowledge. The similarity model defines similarity in terms of the attribute values described above, which are typically either numerical values or reducible to numerical values. An example of an attribute which is not numerical but is reducible to a numerical value is location or address, where the distance between two locations can be expressed as a numerical value.

The algorithm uses a compression structure that enables results to be delivered with less computational effort than other methods known in the literature and is therefore faster than those other methods in typical implementations. The clustering results generated by the algorithm can be represented graphically to facilitate their evaluation, which is a significant benefit in the context of a business application in which the results are displayed for a business user.

In an aspect, a computer-implemented method for processing data includes grouping a set of business objects containing the data into a smaller set of bubbles, each bubble comprising a container that provides only statistical information about the business objects therein. In some aspects, the method further includes clustering the bubbles based on a nearest neighbor similarity, and generating a visualization of the clustered bubbles.

In another aspect, a computer-implemented method includes formatting a set of data for processing, and grouping a set of business objects containing the formatted data into a smaller set of bubbles, each bubble comprising a container that provides only statistical information about the business objects therein.

In yet another aspect, a computer program product, embodied on tangible media, is presented. The computer program product is configured to cause data processing apparatus to perform operations including format a set of data for processing, group a set of business objects containing the formatted data into a smaller set of bubbles, each bubble comprising a container that provides only statistical information about the business objects therein, cluster the bubbles based on a nearest neighbor similarity, and generate a visualization of the clustered bubbles.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for clustering structured data to deliver high-quality results with large data sets. For clarity but without loss of generality, this disclosure describes exemplary algorithms in terms of business objects, but the systems and methods disclosed herein may easily be adapted to work with other objects.

As an initial requirement, a similarity model is defined over a set of business objects, based on specific domain knowledge. The similarity model defines similarity in terms of attribute values, which are typically either numerical values or reducible to numerical values. An example of an attribute that is not numerical but is reducible to a numerical value is a location or an address, where the distance between two locations can be expressed as a numerical value.

The systems and methods disclosed herein use a compression structure employing a clustering algorithm that enables clustering results to be delivered with minimal computational effort. The clustering results generated by the compression structure can be represented graphically and eventually displayed in a business application for a business user to facilitate their evaluation.

Figure 1:
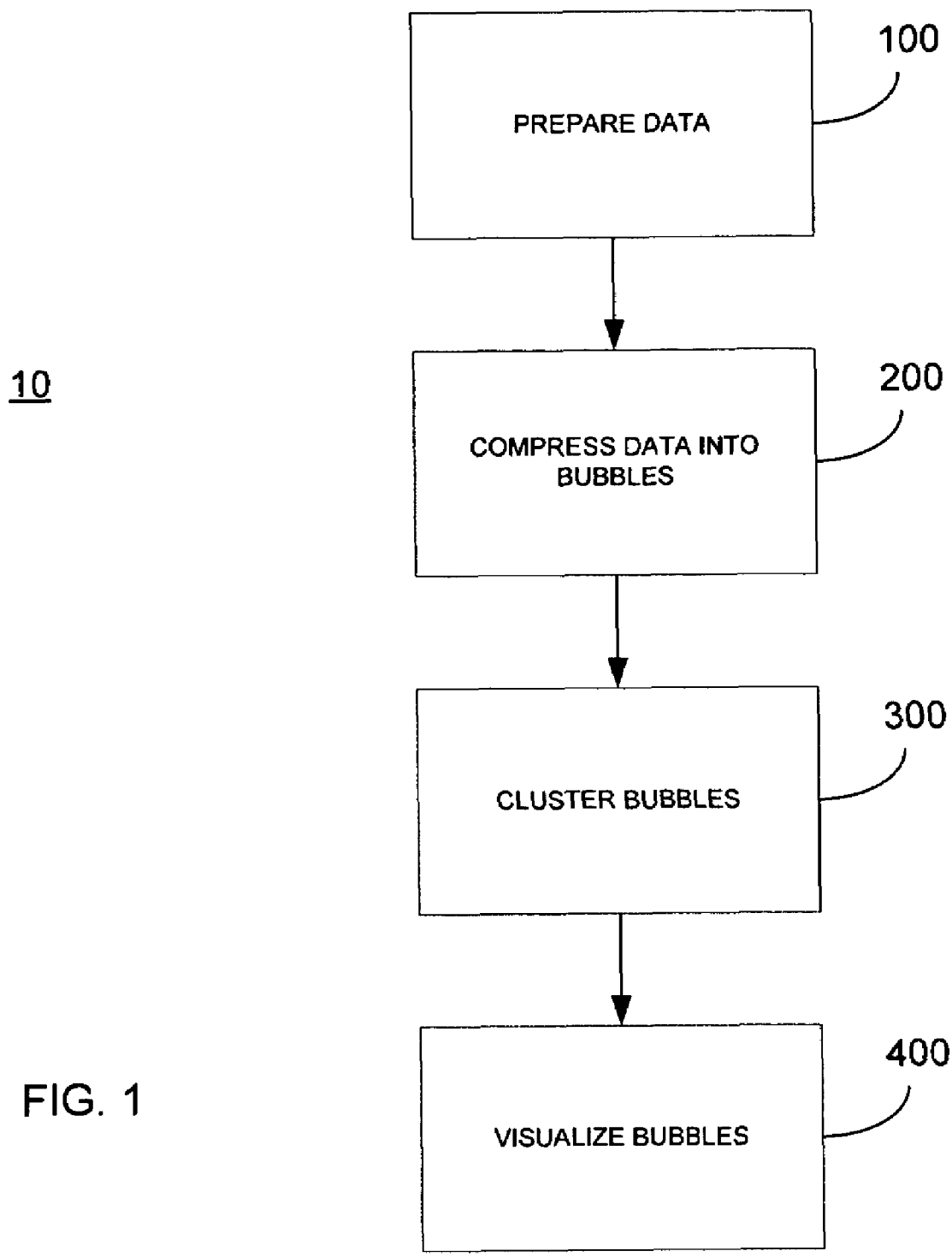
FIG. 1 is a flowchart of a clustering algorithm.

FIG. 1 is a flowchart of a clustering algorithm, and includes the following steps: at 100 data is prepared, at 200 the prepared data is compressed into bubbles, at 300 the bubbles are clustered, and at 400 the clustered bubbles are visualized. Each of these steps and terms therein will now be described and defined in further detail.

Data preparation 100: Gather and format the data. Strip any attributes that are not needed. Use domain knowledge about the remaining attributes to design a similarity model. For each attribute used, this similarity model defines a local similarity measure and a weight. The weighted sum of the local similarities defines a global similarity measure.

Data compression 200: the large set of business objects is grouped into a smaller set of bubbles. Each bubble is a container that shows only statistical information about the objects they contain. The use of bubbles speeds up the computation.

Figure 2:
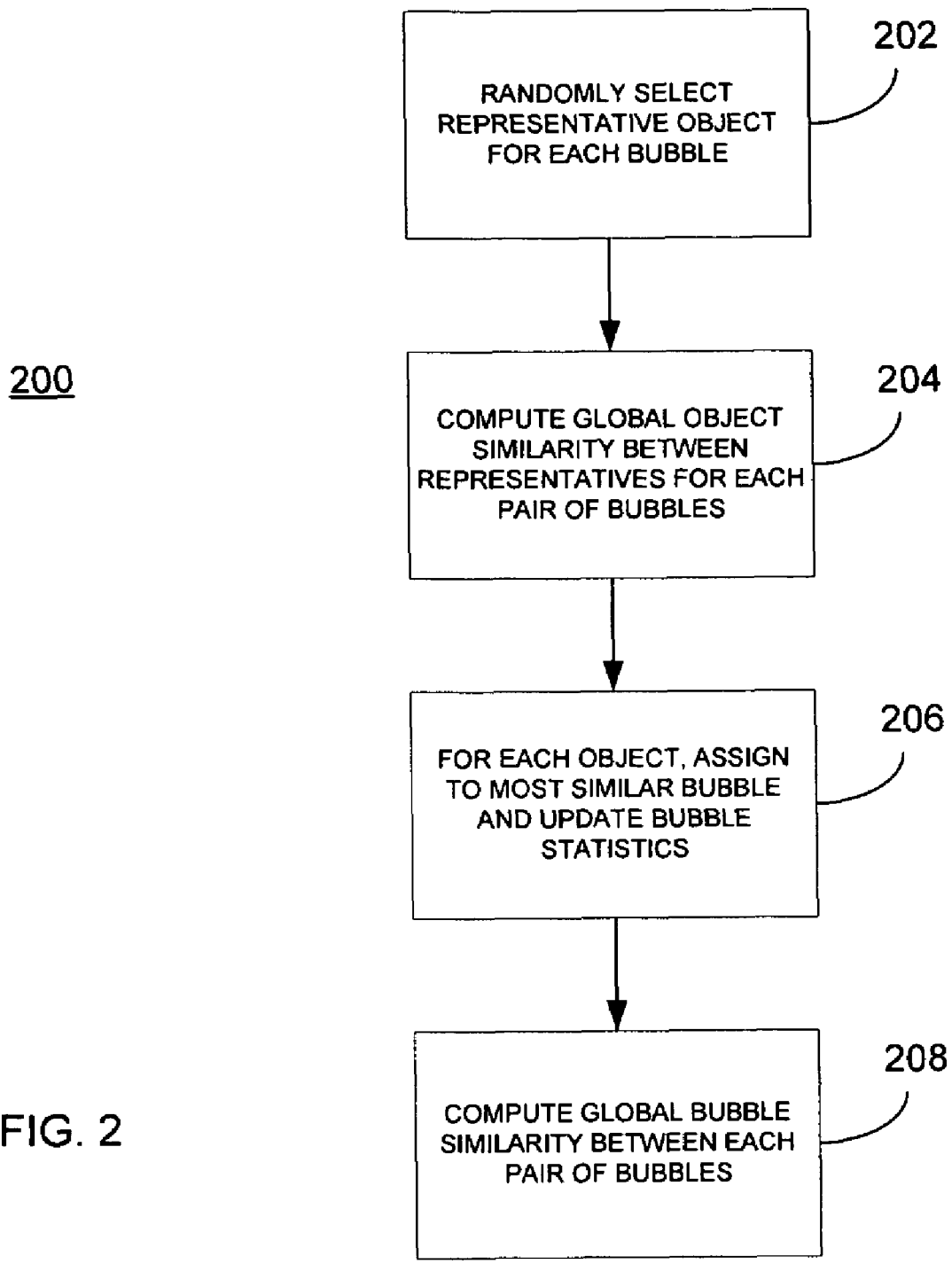
FIG. 2 is a flowchart of a data compression algorithm.

FIG. 2 is a flowchart of the bubble algorithm that can be executed in an embodiment of the data compression 200. At 202, a representative business object is randomly selected for each bubble. At 204, a global object similarity between the representatives for each pair of bubbles is computed. At 206, each business object is assigned to the most similar bubble, and the bubble statistics are updated. At 208, a global bubble similarity between each pair of bubbles is computed, using the representatives and the bubble statistics.

Figure 3:
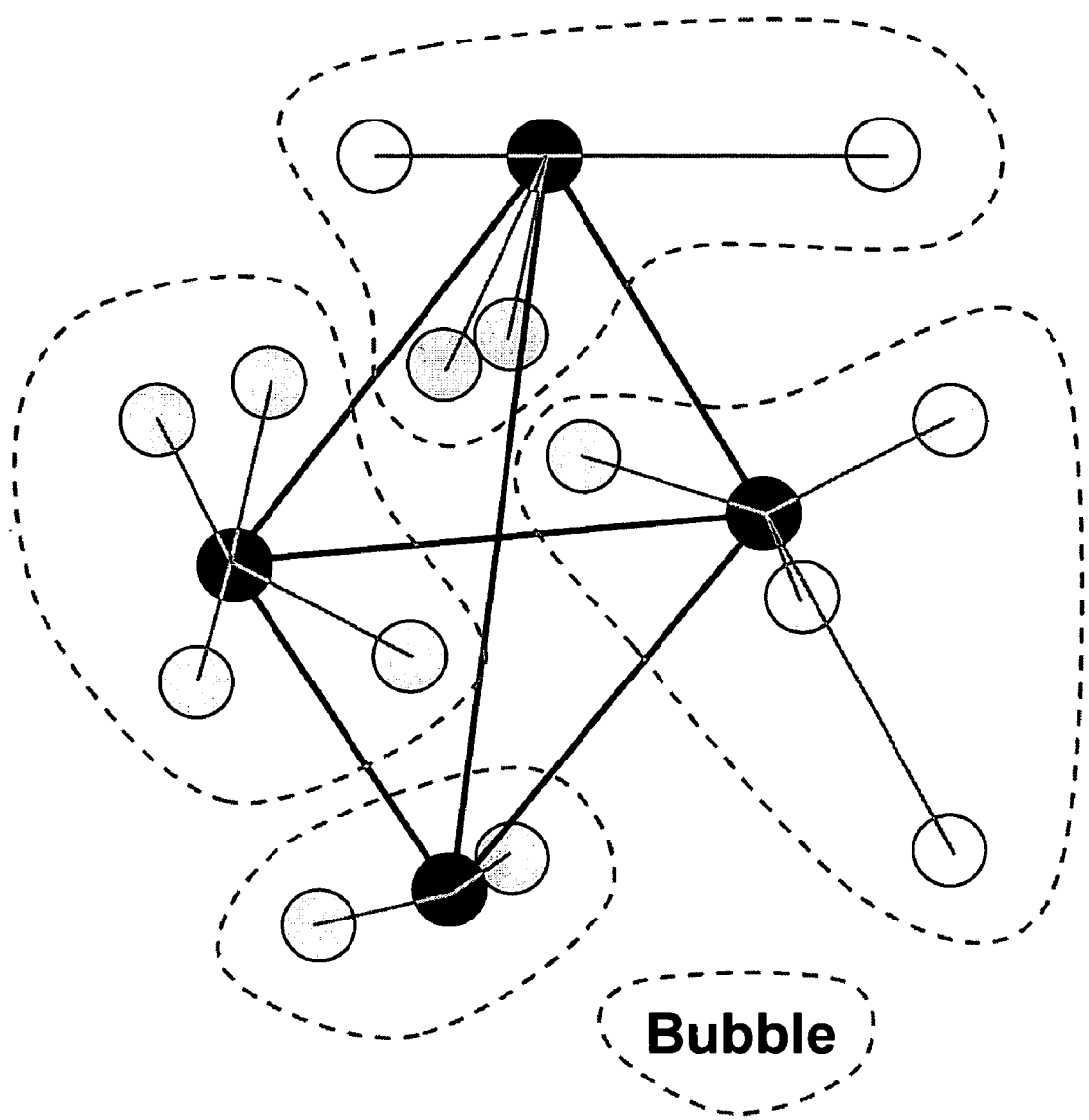
FIG. 3 is a graphical representation of a set of business objects grouped into a smaller set of clustered bubbles.

FIG. 3 shows the clustering and compression of a set of business objects 222 into a smaller number of bubbles 224, where each bubble includes a bubble representative 226 (the randomly-selected business object for each bubble) and associated similar business objects, as well as a graphical depiction of the global object similarity between each pair of bubble representatives 226 and each business object in its bubble, and the global bubble similarity between each pair of bubbles.

Figure 4:
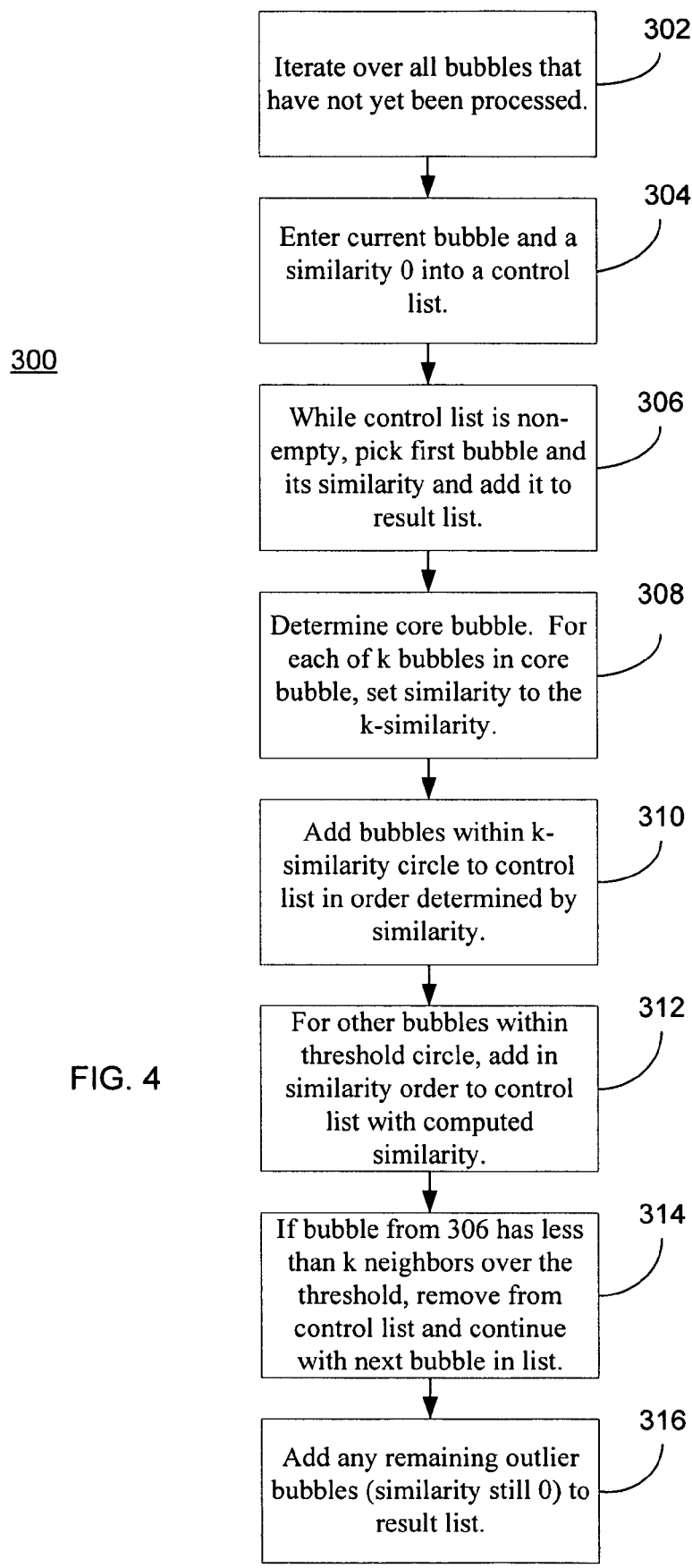
FIG. 4 is a flowchart of a clustering algorithm.

Clustering the bubbles 300: the clustering is based on k-nearest-neighbor similarity. Bubbles with high similarity to each other are assigned to the same cluster. The clustering algorithm works as shown in FIG. 4. At 302 all bubbles that have not yet been processed are iterated over. At 304, the current bubble and a similarity 0 are entered into a control list. While this control list is non-empty, at 306 the first bubble and its similarity is picked and added to the control list.

At 308, if a k-similarity (greater than or equal to threshold) circle can be set to a bubble so that it contains k other bubbles, it is designated a core bubble. For each of the k bubbles in the core bubble, the similarity is set to the k-similarity. At 310, the bubbles within the k-similarity circle are added to the control list in the order determined by the similarity (most similar first). At 312, other bubbles within the threshold circle are added in similarity order to the control list with their computed similarity. If the bubble from step 306 has less than k neighbors over the threshold, at 314 it is removed from the control list and the method continues with the next bubble in the control list. At 316, any remaining outlier bubbles (similarity still 0) are added to the control list.

Figure 5:
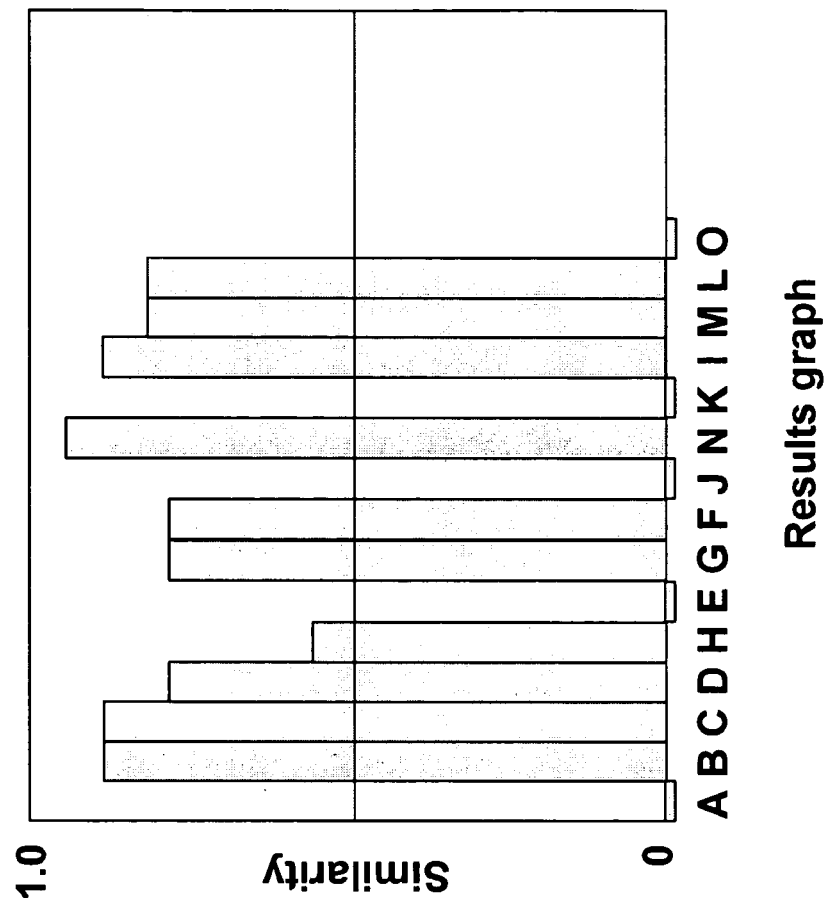
FIG. 5 is a graphical representation of a set of business objects and a graph depicting similarity clusters among bubbles of the business objects.
Figure 5:
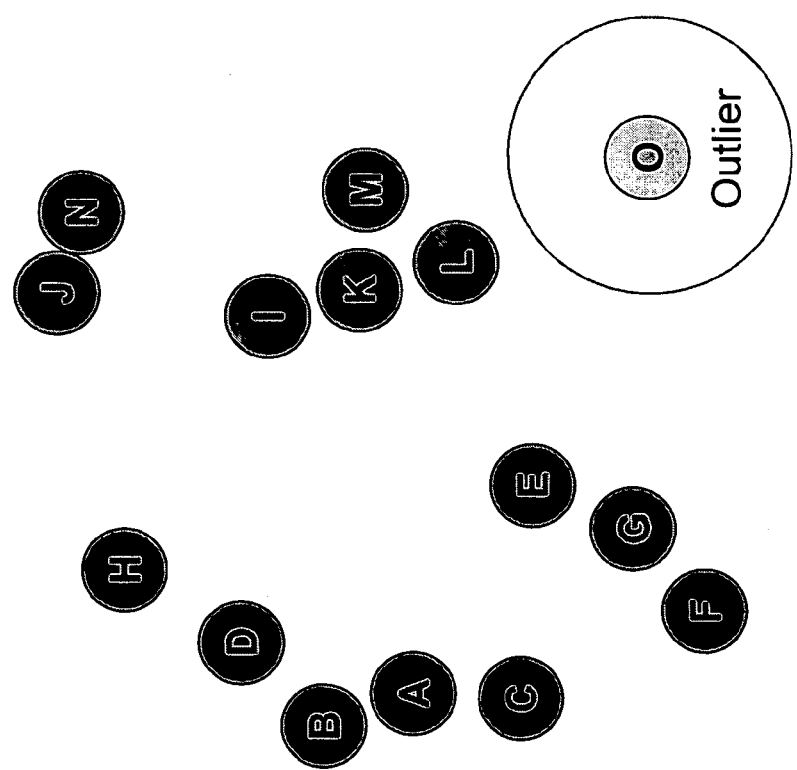

Visualization 400: the output of the clustering algorithm is a result list based on development of the control list. The bubbles can be visualized as a graph, as seen in FIG. 5, in which height on the graph represents similarity. Intuitively, the peaks of the graph represent the clusters in a data set, depicted to the left of the graph in FIG. 5. Hierarchically nested clusters are represented by stepped peaks.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

APPENDIX A

Clustering Business Objects Using Bubbles

Definition 1 (Bubble) Let X be a set of objects from a data set D. Then, a bubble for these objects in X is a 4-tuple B=(rep, n, extent, nnDist), where
- rep is a representative object for X, taken from D; it is assumed to be close to the center of X and therefore, relatively similar to any object in X
- n is the number of objects in X
- extent is the radius of B around rep, enclosing "most" of the objects in X
- nnDist(k, B) is a function estimating the average k-nearest neighbor distances in B.

Before the clustering algorithm can be applied, an appropriate set of bubbles has to be built up. For this purpose, NumBubbles representatives are chosen randomly from the whole index. Subsequently, all objects are assigned to their "nearest neighbor" among those representatives, i.e. the bubble which is most similar to it. During the allocation process, no information about individual members of bubbles is stored; rather, some statistics (which were found to represent the bubble well) are calculated and constantly updated. Finally, when all objects of the data set are assigned to one bubble, the distances between all bubbles are computed. The concept of distance between bubbles is as important as complex; it is the key idea which makes bubbles work after all with the visualization algorithm. It is based on the notions of directional distances and the statistics stored with each bubble, both of which we will introduce now. Note that, in all definitions we consider A and B to be two bubbles, with their respective representatives $\tau_A$ and $\tau_B$.

Definition 2 (Direction of bubbles) For each object $o \in B$, whose distance to $\tau_A$ is less than the distance between $\tau_A$ and $\tau_B$, we define it to be in direction of A. The set of these objects is denoted by $B_A$. Analogously, each object $o \in B$, whose distance to $\tau_A$ is greater than the distance between $\tau_A$ and $\tau_B$, is said to be in reverse direction of A. The set of these objects is written as $B_{revA}$.

Definition 3 (Directional border distance) The directional border distance can then be defined as $$\text{Bubble}(B).borderDistInDirection(A) := dist(r_A, r_B) - \min_{o \in B}(dist(o, r_A)) \quad (1.1)$$

Definition 4 (Average distance) The average distance of bubble B towards A can then be defined as $$\text{Bubble}(B).aveDistInDirection(A) := \overline{dist_{B_A}} = \frac{\sum_{o \in B_A} dist(o, r_B)}{|B_A|} \quad (1.2)$$

The average distance of bubble B in reverse direction of A is defined analogously.

Definition 5 (Standard deviation) The standard deviation of bubble B in direction of A can be defined as $$\text{Bubble}(B).stdDevInDirection(A) := stdDev_{B_A} = \sqrt{\frac{\sum_{o \in B_A}(dist(o, r_B) - \overline{dist_{B_A}})^2}{|B_A|}} \quad (1.3)$$

The standard deviation of bubble B in reverse direction of A is defined analogously.

Definition 6 (Extent) The extent of bubble B in direction of A can be defined as $$\text{Bubble}(B).extentInDirection(A) := ext_{B_A} = \min(\text{Bubble}(B).borderDistInDirection(A), \overline{dist_{B_A}} + 2 \cdot stdDev_{B_A}) \quad (1.4)$$

Finally, we can define the notion of distance between bubbles, which will be used by our clustering algorithm.

Definition 7 (Distance between bubbles) The distance between two bubbles A and B can be defined as $$dist(A,B) := dist(\tau_A, \tau_B) - ext_{A_B} - ext_{B_A} \quad (1.5)$$

The procedure to visualize the bubbles is somewhat more complex than the original compression algorithm. For better readability, the code was split into two parts: initial preparations/creation of bubbles (cf. Algorithm 1) and the visualization algorithm itself (cf. Algorithm 2). The preparation consists of the following steps:

Creation of bubbles—Random documents are selected from a data set; they serve as representatives for the corresponding bubbles.

---
Algorithm 1: Preparing the bubbles
---

```
        input : A data set D of n business objects, parameters NumBubbles
        output: A set bubbles of size NumBubbles
REM  1  randomly select representatives for bubbles
     2  for i ← 1 to NumBubbles do bubbles_i.Rep ← selectRandomDocKey(n)
REM  3  compute distances between bubble representatives
     4  foreach element B_1 of bubbles do
     5  | foreach element B_2 of bubbles do
     6  | | if B_1 ≠ B_2 then B_1.SimToRep(B_2) ← CalculateSimilarity(B_1.Rep, B_2.Rep)
     7  | end
     8  end
REM  9  assign business objects to bubbles
    10  foreach element o of the data set D do
    11  | foreach element B of bubbles do
    12  | | SimToBubble(B) ← CalculateSimilarity(B.Rep, o)
    13  | end
    14  | NearestBubble ← bubble with highest similarity SimToBubble
    15  | assign o to NearestBubble and update distances and statistics for NearestBubble
    16  end
REM 17  compute distances between pairs of bubbles, using collected statistics and SimToRep
    18  foreach element B_1 of bubbles do
    19  | foreach element B_2 of bubbles do
    20  | | if B_1 ≠ B_2 then
    21  | | | B_1.SimTo(B_2) ← ComputeSimilarityToBubble(B_2)
    22  | | | B_1.VirtualReach(B_2) ← ComputeVirtualReachability(B_2)
    23  | | end
    24  | end
    25  end
```

Computation of distances between representatives—The global similarities between all pairs of representatives is computed; they will be needed later in order to determine the distances between all bubbles.

Assigning objects to bubbles—In this phase (which usually takes most of the time), all business objects in the data set are assigned to the bubbles that were just generated. For this purpose, the most similar representative with respect to an object is computed, and subsequently, statistics of the corresponding bubble updated. It is important to note that the bubbles store no information about which objects they contain; to save memory, they only keep some information about their internal characteristics (border distances to other bubbles, number of objects, standard deviation, etc.).

Calculation of distances between bubbles—When all objects of an index have been processed, the distances between all bubbles are computed, using the similarities between the representatives and the statistics collected before. These distances will then serve in the visualization algorithm to retrieve the neighborhood of a certain bubble and hence, to decide if it is a core object or not.

---
Algorithm 2: Visualization using bubbles
---

```
        input : A set bubbles of size NumBubbles, parameters MinPts, ε
        output: An ordered list result of 3-tuples (bubbles, reach-dist,
                core-dist)
     1  foreach element B of bubbles do B.processed ← false
     2  foreach element B of bubbles do
     3  | if B.processed = false then
     4  | | insert (B, ∞) into ControlList
     5  | | while ControlList ≠ ∅ do
     6  | | | e(B, reach-dist) ← first element from ControlList
     7  | | | B.processed ← true
     8  | | | append (B, reach-dist, core-dist) into result
     9  | | | if B is a core object at any distance d ≦ ε then
    10  | | | | core-dist ← CoreDistance(B, MinPts, ε)
    11  | | | | foreach bubble C in N_ε(object-id) with C.processed =
            | | | | false do
    12  | | | | | reach-dist ← B.VirtualReach(C)
    13  | | | | | if C ∉ ControlList then insert (C, reach-dist) into
            | | | | | ControlList
    14  | | | | | else update (p, reach-dist in ControlList)
    15  | | | | end
    16  | | | end
    17  | | end
    18  | end
    19  end
```

The modifications to the actual visualization algorithm are mostly self-explanatory, with one exception: Since the data bubbles only present a "compressed" version of the whole data set, the diagram has to be expanded in an appropriate way to actually match with the original reachability plot. For this purpose, we use an approximation of the actual (but unknown) reachability described by the points in a bubble, the so-called virtual reachability (cf. Definition 8). When the reachability plot is drawn, a bubble B with n objects is represented like this:

The first bar (width=1) considers the actual reachability distance (height=B.reach-dist)

The remaining bars (width n−1) consider the approximated reachability distance (height=B.virt−dist)

After giving a formal definition of this concept, we close this subsection with a discussion of the tradeoff between quality and speed.

Definition 8 (Virtual reachability) Let A and B be two bubbles, and MinPts a natural number. Then, the virtual reachability distance of the n objects described by A w.r.t. B can be defined as follows:

$$\text{virt-dist}_{MinPts}(A, B) = \begin{cases} \text{nndist}(MinPts, A) & \text{if } n \geq MinPts \\ \text{reach-dist}(A, B) & \text{if } n < MinPts. \end{cases} \quad (1.6)$$

It is important to note that the compression rate (i.e. the number of bubbles in comparison to the total number of objects) has an influence on the quality of the results. In other words, the more objects are represented by a single bubble, the faster the algorithm will run and the less details the produced reachability plots will have. Detailed experiments have been conducted, concluding that a 99.7% compression rate can be used on most data sets to obtain results of acceptable quality. At the same time, running times could be reduced by factors 100 to 300.

The invention claimed is:

1. A method of processing data comprising:
    grouping, using one or more processors, a set of business objects containing the data into a smaller set of bubbles, each bubble in the smaller set of bubbles comprising a container that provides only statistical information about the business objects therein, the grouping comprising randomly selecting a representative business object for each bubble, computing a global similarity between pairs of representative business objects among the smaller set of bubbles, and assigning each other business object in the set of business objects to the most similar bubble based on a comparison of a local similarity between each object and all bubbles and the global similarity, the local similarity comprising a local similarity measure and a weight for each attribute in a set of one or more attributes, the global similarity comprising a weighted sum of a local similarity for each attribute in the set of one or more attributes;
    clustering, using the one or more processors, the bubbles in the smaller set of bubbles based on a nearest neighbor similarity, the clustering comprising determining for a first bubble in the set of bubbles whether a threshold comprising a k-similarity can be set for the first bubble such that k other bubbles in the smaller set of bubbles have values of the global similarity between their respective representative business objects and the representative business object of the first bubble that exceeds the k-similarity;
    if the threshold can be set for the first bubble, designating the first bubble as a core bubble, adding the k other bubbles to a control list in ranked order by their values of the global similarity, and setting the value of the global similarity for each of the k other bubbles to the k-similarity;
    if the threshold can not be set for the first bubble, omitting the first bubble from the control list and determining for a second bubble in the smaller set of bubbles whether a threshold comprising a k-similarity can be set for the second bubble such that k other bubbles in the set of bubbles have values of the global similarity between their respective representative business objects and the representative business object of the second bubble that exceeds the k-similarity; and
    generating a visualization of the bubbles on the control list.

2. A method in accordance with claim 1, further comprising formatting the data.

3. A method in accordance with claim 2, wherein formatting the data includes stripping from the data any other attributes that are not in the set of one or more attributes.

4. A method in accordance with claim 1, further comprising defining a similarity model based on the set of attributes.

5. A method in accordance with claim 4, wherein the similarity model comprises the local similarity measure and the weight for each attribute in the set of one or more attributes, and the global similarity.

6. A method in accordance with claim 1, wherein clustering the bubbles includes assigning bubbles having a high similarity to another bubble to the same cluster.

7. A method in accordance with claim 1, wherein clustering the bubbles further includes:
    iterating over all bubbles that have not been processed;
    storing a current bubble and an initial similarity value of 0 into a control list;
    selecting a next bubble having a next similarity value to the current bubble; and
    adding the next bubble and the next similarity value to the control list.

8. A method in accordance with claim 7, further comprising:
    setting a threshold boundary around a specific core bubble having at least a predefined number of other bubbles within the threshold boundary; and
    adding additional bubbles within the threshold boundary to the control list according to their additional similarity values with the specific core bubble.

9. A method in accordance with claim 8, further comprising:
    removing from the control list any bubble having less than the predefined number of other bubbles within the threshold boundary; and
    adding remaining outlier bubbles to the control list to generate a result list.

10. A system comprising:
    a processor; and
    a memory encoding instructions that, when executed by the processor, causes the processor to perform functions comprising:
    formatting a set of business objects for processing, the formatting comprising stripping from each business object in the set any other attributes that are not in a set of one or more attributes in a similarity model that defines similarity between business objects in the set based on attribute values in the set of attribute values;
    grouping the set of business objects into a smaller set of bubbles, each bubble in the smaller set of bubbles comprising a container that provides only statistical information about the business objects therein, the grouping comprising randomly selecting a representative business object for each bubble, computing a global similarity between pairs of representative business objects among the smaller set of bubbles, the global similarity comprising a weighted sum of a plurality of local similarities for the attributes in the set of one or more attributes, assigning each other business object in the set of business objects to the most similar bubble based on a comparison of the local similarity between each business object and all bubbles and the global similarity;

clustering the smaller set of bubbles based on a nearest neighbor similarity, the clustering comprising determining for a first bubble in the smaller set of bubbles whether a threshold comprising a k-similarity can be set for the first bubble such that k other bubbles in the smaller set of bubbles have values of the global similarity between their respective representative business objects and the representative business object of the first bubble that exceeds the k-similarity;

if the threshold can be set for the first bubble, designating the first bubble as a core bubble, adding the k other bubbles to a control list in ranked order by their values of the global similarity, and setting the value of the global similarity for each of the k other bubbles to the k-similarity;

if the threshold can not be set for the first bubble, omitting the first bubble from the control list and repeating the determining for a second bubble in the smaller set of bubbles; and generating a visualization of the bubbles on the control list.

11. A system in accordance with claim 10, wherein formatting the set of data includes stripping from the data any attributes that are not needed.

12. A system in accordance with claim 10, wherein the functions further comprise defining a similarity model based on a subset of attributes about the data.

13. A system in accordance with claim 12, wherein the similarity model includes a local similarity measure and weight for each attribute used, and a global similarity measure based on a weighted sum of the local similarity measures.

14. A system in accordance with claim 10, wherein clustering the bubbles includes assigning bubbles having a high similarity to another bubble to the same cluster.

15. A system in accordance with claim 10, wherein clustering the bubbles further includes:
    iterating over all bubbles that have not been processed;
    storing a current bubble and an initial similarity value of 0 into a control list;
    selecting a next bubble having a next similarity value to the current bubble; and
    adding the next bubble and the next similarity value to the control list.

16. A system in accordance with claim 15, wherein the functions further comprise:
    setting a threshold boundary around a core bubble having at least a predefined number of other bubbles within the threshold boundary; and
    adding additional bubbles within the threshold boundary to the control list according to their additional similarity values with the core bubble.

17. A system in accordance with claim 16, wherein the functions further comprise:
    removing from the control list any bubble having less than the predefined number of other bubbles within the threshold boundary; and
    adding remaining outlier bubbles to the control list to generate a result list.

18. A computer program product, tangibly embodied on a machine-readable storage medium, the computer program product causing data processing apparatus to perform operations comprising:
    defining a similarity model for a set of business objects, the similarity model defining similarity between business objects in the set based on attribute values of a set of one or more attributes of the business objects that are numerical values or reducible to numerical values, the similarity model defining a local similarity comprising a local similarity measure and a weight for each attribute in the one or more attributes, the similarity model further comprising a global similarity measure that is a weighted sum of the local similarities;
    formatting the business objects in the set of business objects by stripping from each business object any other attributes that are not in the set of one or more attributes;
    grouping the business objects in the set of business objects into a smaller set of bubbles, each bubble in the set of bubbles comprising a container that shows statistical information about a contained set of objects that are contained within the bubble;
    selecting randomly a representative business object from the contained set of objects in each bubble;
    determining the global similarity measure between the representative objects for each pair of bubbles within the set of bubbles;
    clustering the bubbles in the smaller set of bubbles, the clustering comprising determining for a first bubble in the smaller set of bubbles whether a threshold comprising a k-similarity can be set for the first bubble such that k other bubbles in the smaller set of bubbles have values of the global similarity between their respective representative business objects and the representative business object of the first bubble that exceeds the k-similarity,
    if the threshold can be set for the first bubble, designating the first bubble as a core bubble, adding the k other bubbles to a control list in ranked order by their values of the global similarity, and setting the value of the global similarity for each the k other bubbles to the k-similarity; and
    if the threshold can not be set for the first bubble, omitting the first bubble from the control list and determining for a second bubble in the smaller set of bubbles whether a threshold comprising a k-similarity can be set for the second bubble such that k other bubbles in the set of bubbles have values of the global similarity between their respective representative business objects and the representative business object of the second bubble that exceeds the k-similarity.

19. A computer program product as in claim 18, wherein the computer program product further causes data processing apparatus to perform operations comprising:
    generating a visualization of the clustered bubbles, the visualization showing the global similarity metric for each bubble in the control list.

* * * * *